(12) United States Patent
Valeri

(10) Patent No.: US 8,268,907 B2
(45) Date of Patent: Sep. 18, 2012

(54) PHOTOCURABLE ACRYLIC COATING COMPOSITIONS HAVING GOOD ADHESION PROPERTIES TO A SUBSEQUENT COATING AND CORRESPONDING COATED SUBSTRATES

(75) Inventor: Robert Valeri, St. Petersburg, FL (US)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 1131 days.

(21) Appl. No.: 12/138,621

(22) Filed: Jun. 13, 2008

(65) Prior Publication Data

US 2009/0311518 A1    Dec. 17, 2009

(51) Int. Cl.
*B32B 27/36* (2006.01)
*A61L 2/10* (2006.01)
*G02C 7/02* (2006.01)

(52) U.S. Cl. .......... 522/79; 428/336; 428/447; 351/159; 351/166

(58) Field of Classification Search .................. None
See application file for complete search history.

(56) References Cited

U.S. PATENT DOCUMENTS

| 5,741,831 | A | 4/1998 | Keita et al. ............... 523/106 |
| 6,100,313 | A | 8/2000 | Treadway ............... 522/170 |
| 6,780,232 | B2 * | 8/2004 | Treadway ............ 106/287.12 |
| 7,037,585 | B2 | 5/2006 | Treadway ............... 428/413 |
| 7,439,278 | B2 | 10/2008 | Jallouli ................. 522/182 |

FOREIGN PATENT DOCUMENTS

| JP | 01263162 | 10/1989 |
| JP | 02028267 | 1/1990 |
| JP | 03014879 | 1/1991 |

OTHER PUBLICATIONS

PCT International Search Report and Written Opinion, issued in International application No. PCT/EP2009/057102, mail date Feb. 9, 2009.

* cited by examiner

*Primary Examiner* — John J Figueroa
(74) *Attorney, Agent, or Firm* — Fulbright & Jaworski L.L.P.

(57) ABSTRACT

An abrasion resistant photocurable acrylic coating composition that can provide good adhesion to subsequent coatings deposited thereon, and a hard coated article, especially an optical article such as an ophthalmic lens, comprising a substrate coated with a coating obtained from the above abrasion resistant acrylic coating composition providing good subsequent adhesion.

24 Claims, No Drawings

PHOTOCURABLE ACRYLIC COATING COMPOSITIONS HAVING GOOD ADHESION PROPERTIES TO A SUBSEQUENT COATING AND CORRESPONDING COATED SUBSTRATES

BACKGROUND OF THE INVENTION

1. Field of the Invention

The invention relates to an abrasion resistant photocurable acrylic coating composition that can provide good adhesion to subsequent coatings deposited thereon, and a hard coated article, especially an optical article such as an ophthalmic lens, comprising a substrate coated with a coating obtained from the above abrasion resistant acrylic coating composition providing good subsequent adhesion.

2. Description of Related Art

It is a common practice in the art to coat at least one main surface of a lens substrate, such as an ophthalmic lens, with several coatings for imparting to the lens substrate additional or improved optical or mechanical properties. These coatings are designated in general as functional coatings.

Thus, it is usual practice to coat at least one main surface of a lens substrate, typically made of an organic material, with successively, starting from the surface of the lens substrate, an abrasion—and/or scratch-resistant coating (hard coat), an anti-reflection coating and an antifouling top coat.

The coatings deposited above the abrasion and/or scratch resistant coatings must have a good adhesion, whatever their deposition process is.

Photocurable acrylic coatings, especially UV curable acrylic coatings used as anti-abrasion coatings are known in the art.

The interest of acrylic coatings in general is that they can be polymerized in a short amount of time.

However, the problem associated with these UV curable acrylic coatings is that it is difficult to get a good adhesion of subsequent coatings deposited thereon.

This problem is especially crucial when the subsequent coatings are sol/gel antireflective coating compositions applied by spin or dip process.

Present commercial UV curable coatings range in wetting properties from fair to very poor and exhibit poor adhesion to coatings that are spin coated onto their surface unless some type of surface treatment is used prior to the application of subsequent coatings.

Acrylic coatings are well known. For example, U.S. Pat. No. 6,100,313 describes a UV curable abrasion resistant coating composition having good tintability and abrasion resistance at the same time.

The coating composition described in this patent is substantially free of volatiles and comprise at least 10% by weight, solids basis of the hydrolysis product of an epoxy-functional alkoxysilane, a polymerizable ether selected from the group consisting of glycidyl ethers, allyl ethers and vinyl ethers and an ethylenically unsaturated monomer other than said polymerizable ether.

U.S. Pat. Nos. 6,780,232 and 7,037,585 also describe similar UV curable coating compositions comprising the hydrolysis product of an epoxy-functional alkoxysilane, an unhydrolyzed epoxy-functional alkoxysilane, an ethylenically unsaturated monomer. The ethylenically unsaturated monomer is generally an acrylate monomer. The required acrylate has an acrylate functionality not greater than 2.

The main technical problem addressed by these patents is to get a tintable hard coating.

There is no mention of a particular specific problem linked to adhesion problems of susbsequently applied coatings.

Accordingly there is still a need of providing photocurable, preferably UV curable abrasion resistant compositions solving such problems.

SUMMARY OF THE INVENTION

A first object of the invention is to provide a photocurable, preferably UV curable abrasion resistant coating composition that has good abrasion resistance and adhesion to a wide range of substrates, whether such substrates have been pretreated or not, and especially to substrates made of PC materials (polycarbonate of Bisphenol A such as the Lexan® type).

A second object of the invention is to provide a photocurable, preferably UV curable abrasion resistant coating composition, which provides, once cured, a good adhesion of subsequent coatings deposited thereon, and especially of sol/gel coatings, including sol/gel antireflective coatings, without requiring additional pretreatment steps, such as soap wash, caustic treatment, corona or plasma pretreatment.

To achieve at least one of the foregoing objects, the inventor has found a specific composition by combining specific acrylate, epoxy compounds, hydrolyzed silanols, and non polymerizable ether compounds and carefully controlling their respective amounts.

This coating composition comprises:
- 15 to 30 parts by weight of at least one monomeric compound A having from 5 to 7 acrylate groups;
- 7 to 20 parts by weight of at least one monomeric or oligomeric compound A' selected from monomers or oligomers having from 3 to 4 acrylate groups;
- 10 to 25 parts by weight of at least one monomeric or oligomeric compound A" having two acrylate groups;
- 2 to 10 parts by weight of at least one compound B having at least two epoxy groups and that does not comprise any silicon atom bearing hydrolysable groups or hydroxyl groups;
- 1 to 7 parts by weight of a hydrolyzate C of an epoxysilane having from 2 to 6 functional groups generating a silanol group under hydrolysis;
- 20 to 60 parts by weight of at least one non polymerisable ether compound D;
- an effective amount of a cationic polymerization photoinitiator;
- an effective amount of a radical polymerization initiator.

The invention also relates to an article comprising a transparent substrate, comprising a cured abrasion resistant coating applied thereon which has been obtained by applying and curing the above composition.

The invention further relates to the article having a cured abrasion resistant coating according to the invention and at least one subsequent coating deposited thereon.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION OF THE INVENTION AND PREFERRED EMBODIMENTS

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, reaction conditions, etc. used herein are to be understood as modified in all instances by the term "about."

Herein, the term "lens" means an organic or mineral glass lens, comprising a lens substrate which may be coated with one or more coatings of various natures.

When the optical article comprises one or more surface coatings, the term "to deposit a layer onto the optical article" means that a layer is deposited onto the outermost coating of the optical article.

The term "acrylate" does not encompass methacrylate compounds.

The abrasion resistant UV curable coating composition according to the invention comprises and preferably consists in the mixture of monomers A, A', A", B, C and D as defined hereafter, and used in the following respective amounts:

15 to 30 parts by weight of at least one monomeric compound A having from 5 to 7 acrylate groups;

7 to 20 parts by weight of at least one monomeric or oligomeric compound A' selected from monomers or oligomers having from 3 to 4 acrylate groups;

10 to 25 parts by weight of at least one monomeric or oligomeric compound A" having two acrylate groups;

2 to 10 parts by weight of at least one compound B having at least two epoxy groups and that does not comprise any silicon atom bearing hydrolysable groups or hydroxyl groups;

1 to 7 parts by weight of a compound C which is an hydrolyzate of an epoxysilane having from 2 to 6 functional groups generating a silanol group under hydrolysis;

20 to 60 parts by weight of at least one non polymerisable ether compound D;

an effective amount of a polymerization cationic photoinitiator;

an effective amount of a radical polymerization initiator.

In a preferred embodiment, the total weight of compounds A, A' and A" in the curable composition represents at least 80% of the total weight of the polymerizable compounds comprised in said coating composition, preferably at least 90%.

The UV curable abrasion resistant coating composition comprises 15 to 30 parts by weight of at least one monomeric compound A, having from 5 to 7 acrylate groups.

The monomeric compound A can be chosen from pentafunctional acrylates, hexafunctional acrylates, heptafunctional acrytates.

Preferably, compound A has 5 acrylate groups.

Examples of such monomers are: dipentaerythritol pentaacrylate, pentaacrylate esters.

The UV curable abrasion resistant composition comprises 7 to 20 parts by weight of at least one monomeric or oligomeric compound A' selected from monomers or oligomers having from 3 to 4 acrylate groups.

Examples of trifunctional acrylates are: trimethylolpropane triacrylate, pentaerythritol triacrylate, ethoxylated trimethylolpropane triacrylate.

Examples of tetraacrylates are: pentaerythritol tetraacrylate, ethoxylated pentaerythritol tetraacrylate.

The inventor has found that the combined presence of the compounds A and A' in the claimed proportions allows to get a good abrasion resistance of the cured coating composition along with a limited (or no) tendency to cracking.

If there is too much compound A in the coating composition, i.e. more than 30 parts by weight, the resulting cured coating may be subjected to cracking, which is also the case if there is less than 7 parts by weight of compound A' in the coating composition. Preferably, compound A' comprises a mixture of tri and tetra functional acrylates.

More preferably, compound A' consists in a mixture of tri and tetra functional acrylates.

Preferably, tri and tetrafunctional acrylates are used in equivalent ratios. Typically compound A' is a mixture of pentaerythritol tri and tetra acrylates.

The UV curable abrasion resistant composition comprises 10 to 25 parts by weight, preferably 18 to 22, of an oligomeric or monomeric compound A" having 2 acrylate groups. Typical examples of difunctional acrylates are 1,4-butanediol diacrylate, 1,6-hexanediol diacrylate, polyethylene glycol diacrylate, tetraethylene glycol diacrylate, polyethylene glycol diacrylate, ethoxylated bisphenol A diacrylate, tetraethylene glycol diacrylate, tripropylene glycol diacrylate, neopentyl glycol diacrylate, diethylene glycol diacrylate.

Preferably, the compound A" comprises at least one polyoxyalkyleneglycol diacrylate.

The compounds A" are used i.a as reactive diluents, to adjust the properties.

They have a low viscosity but may reduce the abrasion resistance properties due to lower capabilities of cross-linking, compared to compounds A and A'. It is recommended to use them at low concentrations, in the range required above.

It has been found that compounds A" contributes, to a certain extent, to bring tintability to the final abrasion resistant cured coating.

Additional monomers, for example, monoacrylate compounds may be added, but in a minor amount, in order not to decrease the abrasion resistant properties of the curable composition. Preferably, the coating composition comprises less than 5% by weight of monoacrylate compounds relative to the total weight of the composition, more preferably less than 2% by weight, and even better 0%.

Example of monofunctional acrylates that can be used are: 2-ethoxyethyl acrylate, 2-ethoxyethyl acrylate, caprolactone acrylate, isobornyl acrylate, lauryl acrylate, polypropylene glycol monoacrylate.

The epoxy compounds B used in the composition according to the invention are compounds comprising at least two epoxy groups.

Preferably, they contain no more than 4, better no more than 3 epoxy groups, and even better no more than two epoxy groups i.e. only two epoxy groups. Compound B does not comprise any silicon atom bearing hydrolysable groups or hydroxy groups.

Specific examples of the compounds having epoxy groups include bisphenol A diglycidylether, novolac-type epoxy resins, 1,4-butanediol diglycidylether, 1,6-hexanediol diglycidylether, propylene glycol diglycidylether, trisphenol methane triglycidylether, glycerin triglycidylether, trimethylolpropane triglycidylether.

Specific examples of the compound having alicyclic epoxy group include 2,4-epoxycyclohexylmethyl-3,4-epoxycyclohexanecarboxylate, bis(3,4-epoxycyclohexylmethyl)adipate, 2-(3,4-epoxycyclohexyl-5,5-spiro-3,4-epoxy)cyclohexanone-meta-dioxane, bis(2,3-epoxycyclopentyl)ether, and EHPE-3150 (alicyclic epoxy resin, manufactured by DAICEL CHEMICAL INDUSTRIES, LTD.). Bisphenol F epoxy (PY306, GY281 from Ciba-Geigy), Epoxy phenol novolac (PY 307 from Ciba-Geigy), Alicyclic diepoxy carboxylate (CY-179 from Ciba-Geigy),3,4 Epoxycyclohexylmethyl-3,4 epoxycyclohexane Carboxylate (Union Carbide UVR-6105 and UVR 6110), Bis-(3,4-epoxycyclohexyl) Adipate (Union Carbide UVR-6128).

The amount of epoxy compound B ranges from 2 to 10 parts by weight, preferably 2 to 5 parts by weight in the abrasion resistant coating composition.

Preferably, compounds B do not contain other reactive function than the epoxy group, capable of reacting with other polymerizable functions present in the composition and that would be linked to the polymer matrix of the coating. In other words, preferred epoxy compounds B are "pure" epoxy compounds.

Preferably, compounds A, A', A" and B do not bear additional reactive function than their respectively described polymerizable functions, capable of reacting with other polymerizable functions present in the composition.

The abrasion resistant curable composition comprises 1 to 7 parts by weight of a compound C which is a hydrolyzate of a specific epoxysilane as described hereafter.

Despite the epoxysilane is under hydrolyzed form, the amount of epoxysilane will be conventionally defined as the weight of the initial precursor (typically epoxyalkoxysilane) before its hydrolysis.

The epoxysilane(s) used in the coating composition of the invention has from 2 to 6 functional groups generating a silanol group under hydrolysis.

Preferably, said epoxysilane has the following formula:

$$R_n Y_m Si(X)_{4-n-m} \quad (1)$$

Wherein R groups, identical or different, are monovalent organic groups linked to the Si atom by a carbon atom and comprising at least one, preferably one epoxy function; X groups, identical or different, are hydrolyzable groups; Y is a monovalent organic group that does not contain an epoxy group and which is linked to the Si atom by a carbon atom, n and m being integers such as n=1 or 2 and n+m=1 or 2.

The preferred R groups have the following formulas V and VI:

V

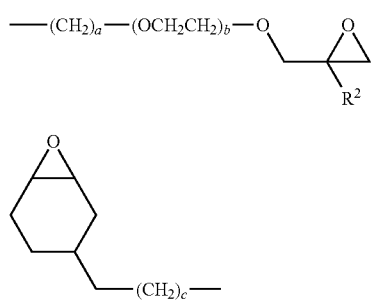

VI wherein $R^2$ is an alkyl group, preferably a methyl group or a hydrogen atom, more preferably a hydrogen atom ; a and c are integers ranging from 1 to 6 and b is representing 0, 1 or 2.

Most preferred epoxysilanes are those wherein, in formula 1, n=1, m=0 and X is a C1-C5 alkoxy group, preferably $OCH_3$.

Many epoxy-functional alkoxysilanes are suitable as hydrolysis precursors, including epoxydialkoxysilanes such as γ-glycidoxypropylmethyldimethoxysilane, γ-glycidoxypropylmethyldiethoxysilane, γ-glycidoxypropyl-methyl-diisopropenoxysilane, and γ-glycidoxyethoxypropylmethyldimethoxysilane; Epoxytrialkoxysilane such as glycidoxymethyl-trimethoxysilane, glycidoxymethyltriethoxysilane, glycidoxymethyl-tripropoxysilane, glycidoxymethyl-tributoxysilane, beta-glycidoxyethyltrimethoxysilane, beta-glycidoxyethyltriethoxysilane, beta-glycidoxyethyl-tripropoxysilane, beta-glycidoxyethyl-tributoxysilane, beta-glycidoxyethyltrimethoxysilane, alpha-glycidoxyethyl-triethoxysilane, alpha-glycidoxyethyl-tripropoxysilane, alpha-glycidoxyethyltributoxysilane, gamma-glycidoxypropyl-trimethoxysilane, gamma-glycidoxypropyl-triethoxysilane, gamma-glycidoxypropyl-tripropoxysilane, gamma-glycidoxypropyltributoxysilane, beta-glycidoxypropyl-trimethoxysilane, beta-glycidoxypropyl-triethoxysilane, beta-glycidoxypropyl-tripropoxysilane, beta-glycidoxypropyltributoxysilane, alpha-glycidoxypropyl-trimethoxysilane, alpha-glycidoxypropyl-triethoxysilane, alpha -glycidoxypropyl-tripropoxysilane, alpha-glycidoxypropyltributoxysilane, gamma-glycidoxybutyl-trimethoxysilane, delta-glycidoxybutyl-triethoxysilane, delta-glycidoxybutyl-tripropoxysilane, delta-glycidoxybutyl-tributoxysilane, delta-glycidoxybutyl-trimethoxysilane, gamma-glycidoxybutyl-triethoxysilane, gamma-glycidoxybutyl-tripropoxysilane, gamma-propoxybutyl-tributoxysilane, delta-glycidoxybutyl-trimethoxysilane, delta-glycidoxybutyl-triethoxysilane, delta-glycidoxybutyl-tripropoxysilane, alpha-glycidoxybutyl-trimethoxysilane, alpha-glycidoxybutyl-triethoxysilane, alpha-glycidoxybutyl-tripropoxysilane, alpha-glycidoxybutyl-tributoxysilane, (3,4-epoxycyclohexyl)-methyl-trimethoxysilane, (3,4-epoxycyclohexyl)methyl-triethoxysilane, (3,4-epoxycyclohexyl)methyl-tripropoxysilane, (3,4-epoxycyclohexyl)-methyl-tributoxysilane, (3,4-epoxycyclohexyl)ethyl-triethoxysilane, (3,4-epoxycyclohexyl)ethyl-triethoxysilane, (3,4-epoxycyclohexyl)ethyl-tripropoxysilane, (3,4-epoxycyclohexyl)-ethyl-tributoxysilane, (3,4-epoxycyclohexyl)propyl-trimethoxysilane, (3,4-epoxycyclohexyl)propyl-triethoxysilane, (3,4-epoxycyclohexyl)propyl-tripropoxysilane, (3,4-epoxycyclohexyl)propyl-tributoxysilane, (3,4-epoxycyclohexyl)butyl-trimethoxysilane, (3,4-epoxycyclohexy)butyl-triethoxysilane, (3,4-epoxycyclohexyl)-butyl-tripropoxysilane, and (3,4-epoxycyclohexyl)butyl-tributoxysilane.

Preferably, epoxysilanes are chosen within the group consisting of γ-glycidoxypropyl triethoxysilane, γ-glycidoxypropyl trimethoxysilane, 2-(3,4-epoxycyclohexyl)ethyl trimethoxysilane and 2-(3,4-epoxycyclohexyl) ethyltriethoxysilane or a mixture of two or more thereof.

One preferably uses γ-glycidoxypropyltrimethoxysilane (GLYMO).

According to one aspect of this invention, the epoxysilane having from 2 to 6 functional groups generating a silanol group under hydrolysis is hydrolyzed before being mixed to the other components of the composition.

The hydrolysis may be performed as known in the art, by using acidic catalysts (hydrochloric acid, acetic acid), in presence of water.

Hydrolysis of the alkoxy groups liberates the associated alcohol to form silanol groups which will condense spontaneously. Preferably, the alkoxysilane is reacted with a stoichiometric amount of water to hydrolyze the hydrolysable groups, typically the alkoxy groups.

The abrasion resistant curable composition comprises 20 to 60 parts by weight of a non polymerizable ether compound D.

Preferably, the non polymerizable ether compound is an alcohol ether compound.

The alcohol ether compound comprises at least one glycol ether.

Preferably, the at least one glycol ether comprises a mixture of 1-methoxy-2-propanol and 2-methoxy-1-propanol. Such a compound is sold commercially by Dow Chemical under the name Dowanol PM®. Glycol ethers generally exhibit low surface tensions.

It has been found that compound D contributes to the improvement of adhesion to the substrate and to subsequent coatings applied later on.

The photocurable abrasion resistant coating composition according to the invention comprises at least one cationic polymerization photoinitiator. By "cationic polymerization photoinitiator", it is meant a photoinitiator capable of inducing a cationic polymerization when irradiated with an appropriate radiation.

Examples of the cationic photoinitiators include onium salts, such as diazonium salts, sulfonium salts, and iodonium salts. Aromatic onium salts are particularly preferred. Also preferred are iron-arene complexes such as ferrocene derivatives, and arylsilanol-aluminum complexes and the like.

Example of commercially available cationic photoinitiators are CYRACURE UVI-6970, CYRACURE™ UVI-6974, and CYRACURE™ UVI-6990 (each manufactured by Dow Chemical, USA), IRGACURE™ 264 (manufactured by Ciba Specialty Chemicals Inc.), and CIT-1682 (manufactured by Nippon Soda).

The amount of the cationic photoinitiator in the UV curable abrasion resistant coating composition (as solid component) usually ranges from about 0.01 to about 15% by weight, preferably 0.1 to 5% by weight (relative to the weight of monomers comprising an epoxy group in the composition).

In addition to cationic photoinitiators, the hard coating composition also comprises one or more radical initiators, preferably one or more radical photoinitiators.

Examples of such radical photo initiators include DAROCURE 1173, IRGACURE 184, IRGACURE 500, IRGACURE 651, IRGACURE 819 and IRGACURE 907 (each manufactured by Ciba Specialty Chemicals Inc.). The amount of the radical photo initiator in the hard coat agent composition (as solid component) is for example in the range of from about 0.5 to about 5% by weight to the weight of ethylenically unsaturated monomers, especially acrylate monomers.

The abrasion resistant coating composition may comprise additional additives, such as dyes, surfactants.

One preferred surfactant is a monocarbinol terminated polydimethyl siloxane that contains primary hydroxyl groups which react with the epoxies and silanol in both the UV curable abrasion resistant coating composition and any subsequent coating applied to yield excellent inter-coating adhesion.

Examples of surfactants are those commercialized under the trade name Silwet™.

The cationic polymerization initiator used for achieving the partial polymerization step is photoactivated, preferably under UV irradiation.

Typically, the energy that is applied to the hard coating for achieving polymerization ranges from 2.65 to 3.05 J/cm$^2$ (UV-B).

The irradiation is typically applied during a time ranging from 5 seconds to 30 seconds, preferably from 15 to 18 seconds.

The thickness of the cured coating may be adapted to the specific application required and ranges preferably from 2 to 20 microns, more preferably from 5 μm to 15 μm, even better from 8 to 10 microns, typically from 8.5 to 9.5 μm.

The substrate on which the UV curable abrasion resistant coating composition according to the invention is applied may be made of mineral glass or organic glass, preferably organic glass. The organic glass substrate can be made of any material currently used for organic ophthalmic lenses, e.g., either thermoplastic materials such as thermoplastic polycarbonates and polyurethanes, or thermosetting (cross-linked) materials, such as: those obtained by polymerization of allyl derivatives such as the allyl carbonates of linear or branched aliphatic or aromatic polyols, such as ethylene glycol bis(allyl carbonate), diethylene glycol bis(2-methyl carbonate), diethylene glycol bis(allyl carbonate), ethylene glycol bis(2-chloroallyl carbonate), triethylene glycol bis(allyl carbonate), 1,3-propanediol bis(allyl carbonate), propylene glycol bis(2-ethylallyl carbonate), 1,3-butenediol bis(allyl carbonate), 1,4-butenediol bis(2-bromoallyl carbonate), dipropylene glycol bis(allyl carbonate), trimethylene glycol bis(2-ethylallyl carbonate), pentamethylene glycol bis(allyl carbonate), isopropylene bisphenol A bis(allyl carbonate), poly(meth)acrylates and copolymers based substrates, such as substrates obtained by the polymerization of alkyl methacrylates, in particular $C_1$-$C_4$ alkyl methacrylates such as methyl(meth)acrylate and ethyl(meth)acrylate, substrates comprising (meth)acrylic polymers and copolymers derived from bisphenol-A, polyethoxylated aromatic (meth)acrylates such as the polyethoxylated bisphenolate di(meth)acrylates, polythio(meth)acrylates, thermosetting polyurethanes, polythiourethanes, polyepoxides, polyepisulfides, as well as copolymers thereof and blends thereof. By (meth)acrylate, it is meant a methacrylate or an acrylate.

The substrates particularly recommended are substrates made of PC (polycarbonate) (substrate of AIRWEAR® Essilor lenses).

Among other recommended substrates are substrates obtained by polymerization of thio(meth)acrylic monomers, such as those disclosed in the French patent application FR 2734827 and substrates made of polythiourethane materials.

The substrates may obviously be obtained by polymerising mixtures of the above monomers.

Preferably, the substrate is an ophthalmic lens.

The inventive hard coating may be applied directly on the naked surface of the substrate, either pretreated or not or on a surface that has previously been coated by a functional coating, such as an impact resistant and or adhesion promoting primer coating, the thickness of which ranges generally from 0.5 to 3 microns, preferably 0.8 to 1.2 microns.

Such impact primer resistant coatings are known in the art and disclosed for example in WO0050928, EP1651986, EP4041 11, EP0680492, incorporated herein by reference.

The abrasion resistant curable coating compositions have the feature to confer good adhesion properties to subsequent coatings deposited thereon, whatever the nature of the subsequent coating, and preferably to a subsequent coating which has been obtained from a liquid composition.

Subsequent coatings include, but are not limited to sol-gel anti-reflective coatings, other UV curable coatings containing epoxies or silanols, classical thermally cured polysiloxane hard coatings or any coating containing free hydroxyl groups.

Particularly good adhesion properties have been found for subsequent coatings obtained by a sol/gel process, and which preferably are comprised in an antireflective stack.

As known in the art, such coatings are obtained by hydrolysis of a precursor containing hydrolysable groups, such as an alkoxysilane or a metal alkoxide, which is partially condensed to make a sol.

Typically, the precursor can be one or more epoxyalkoxysilanes.

The precursor can be chosen between the same epoxysilanes as previously described for compound B of the abrasion resistant curable composition of the invention.

Preferably, the epoxysilane hydrolyzate contains a colloidal filler.

Antireflective stacks that give the best adhesion properties with the abrasion resistant coating composition of the invention are described in US patent application n°20060275627, the content of which is incorporated herein by reference.

Preferably, the first layer of the sol/gel AR which is adjacent to the abrasion resistant coating of the invention is made of a high refractive index or mean refractive index layer, having a refractive index $n_D^{25}$ of, respectively, 1.70 to 2 and 1.50 to 1.80 and resulting from the hardening of a first hardenable composition and comprising (i) an organic-inorganic hybrid matrix resulting from the hydrolysis and condensation of at least one precursor compound containing an epoxy or (meth)acryloxy group and at least two functions hydrolysable to silanol groups, and (ii) at least one colloidal metal oxide or at least one colloidal chalcogenide or mixtures of these compounds in the form of particles from 1 to 100 nm in diameter, and preferably from 2 to 50 nm.

In a particularly advantageous manner, the mineral particles dispersed in the matrix of the high or mean refractive index layer contain at least one oxide or colloidal chalcogenide selected from the following group: TiO2, ZnO, ZnS, ZnTe, CdS, CdSe, IrO2, WO3, Fe2O3, FeTiO3, BaTi4O9, SrTiO3, ZrTiO4, MoO3, Co3O4, SnO2, bismuth-based ternary oxide, MoS2, RuO2, Sb2O4, BaTi4O9, MgO, CaTiO3, V2O5, Mn2O3, CeO2, Nb2O5, RuS2, and mixtures of these compounds. The high refractive index layer may also contain silica SiO2.

The metal oxide dispersed in the high index layer is preferably a composite titanium oxide in the form of rutile.

According to another preferred characteristic, the mineral particles dispersed in the organic-inorganic matrix of the high or mean index layer have a composite structure based on TiO2, SnO2, $ZrO_2$ and SiO2. Such particles are described in the Japanese patent application JP-11310755.

Metal oxide particles in the form of a composite having a core/shell structure with a core of TiO2, SnO2 in the form of rutile and a shell comprising a mixture of ZrO2 and SiO2 such as described in the Japanese patent application JP-2000-204301 are particularly recommended in the context of the invention.

Preferably, the first layer of the AR coating has a thickness ranging from 10 to 200 nm, preferably from 80 to 150 nm.

In subsequent steps, other layers of the AR coating may be applied, such as a low refractive index layer (refractive index of 1.38 to 1.44) having preferably a thickness ranging from 40 to 150 nm, if the AR coating is a bi-layer coating, or a high refractive index layer followed by a low refractive index layer if the AR coating is a 3-layered stack.

The invention is further illustrated by the examples described below. These examples are meant to illustrate the invention and are not to be interpreted as limiting the scope of the invention.

EXAMPLES

Experimental:

The following compositions are prepared:

The amount of each component is expressed in parts by weight.

GLYMO is separately hydrolyzed and added to a mix of the other components.

TABLE 1

| Component | Composition 1 | Composition 2 | Composition 3 |
|---|---|---|---|
| SR399 (dipentaerythritol pentaacrylate) | 28.283 | 21.801 | 21.801 |
| PETIA (pentaerythritol tri and tetraacrylates (1:1)) | 14.884 | 11.473 | 11.473 |
| SR230 (diethyleneglycol diacrylate) | 22.332 | 17.214 | 17.214 |
| SR238 (1,6 hexanedioldiacrylate) | 2.987 | 2.302 | 2.302 |
| GE-21 (1,4 butanediol diglycidylether) | 3.722 | 2.869 | 2.869 |
| IRG-500 (Free radical photoinitiator) | 1.86 | 1.434 | 1.434 |
| SLF-18 (Surfactant-Alkoxylated linear alcohol) | 0.186 | 0.143 | 0.143 |
| UVI-6992 (cationic photoinitiator) | 0.186 | 0.143 | 0.143 |
| GLYMO (γ-glycidoxypropyltrimethoxysilane) | 2.520 | 1.936 | 3.260 |
| 0.1N HCl | 0.578 | 0.445 | 0.740 |
| DOWANOL PM (1-methoxy-2 propanol) | 11.067 | 40.000 | 38.379 |
| Propylene Glycol Propyl Ether | 11.067 | — | — |
| Silwet L7608 (surfactant) | 0.314 | 0.242 | 0.242 |
| TOTAL | 100.0 | 100.0 | 100.0 |

TABLE 2

| Component | Composition T (Comparative) | Composition U (Comparative) | Composition V (Comparative) |
|---|---|---|---|
| SR399 (dipentaerythritol pentaacrylate) | 38.00 | 36.48 | 28.283 |
| PETIA (pentaerythritol tri and tetraacrylates (1:1)) | 20.00 | 19.20 | 14.884 |
| SR230 (diethyleneglycol diacrylate) | 30.00 | 28.80 | 22.332 |
| SR238 (1,6 hexanedioldiacrylate) | 4.00 | 3.84 | 2.987 |
| GE-21 (1,4 butanediol diglycidylether) | 5.00 | 4.80 | 3.722 |
| IRG-500 (Free radical photoinitiator) | 2.50 | 2.40 | 1.86 |
| SLF-18 (Surfactant-Alkoxylated linear alcohol) | 0.25 | 0.24 | 0.186 |
| UVI-6992 (cationic photoinitiator) | 0.25 | 0.24 | 0.186 |
| GLYMO (γ-glycidoxypropyltrimethoxysilane) | — | 3.26 | — |
| 0.1N HCl | — | 0.74 | — |
| DOWANOL PM (1-methoxy-2 propanol) | — | — | 11.067 |
| Propylene Glycol Propyl Ether | — | — | 11.067 |
| Silwet L7608 (surfactant) | — | — | 0.314 |
| TOTAL | 100 | 100 | 96.9 |

General Procedures for Deposition:
1) Coating and Curing of the Abrasion Resistant Coating.

The abrasion resistant coating compositions are applied on polycarbonate (PC) lenses in the following conditions: After surfacing stock hard coated semi-finished polycarbonate lenses having production vacuum deposited anti-reflective coatings on the convex side, the abrasion resistant coating is spin coated on the concave side and UV cured as described below:

Application: The abrasion resistant coating is applied to the concave side of a spinning lens over a period of four (4) seconds at a spin rate of 1200 rpm. After application the lens accelerates to 1300 rpm in less than one (1) second and spins at 1300 rpm for four (4) seconds.

UV Curing conditions: The abrasion resistant coatings were cured using a Lesco "EZ-CURE UV" Curing module, with a Fusion system H+ Bulb with an exposure time of approximately 15 seconds, leaving an average of 14.2% unsaturated monomer versus 100% unsaturation for the liquid coating. The obtained thickness ranges from 8 to 10 microns for compositions 1 to 3 and compositions T, U and V.

The lenses were then allowed to cool prior to application of the spin AR coating.
2) Deposition of the AR Coating and Curing Procedure:

The spin AR sol/gel coatings were applied using an AlO spin coating machine and cured to a tack-free state using IR heaters in the AlO machine.

The coated lenses underwent a final cure of 130° C. for twenty (20) minutes in a DIMA conveyer oven.

The detailed deposition process is given hereafter:
2.1—Preparation Process of the AR Solutions.
2.1.1—High Refractive Index (HI) sol/gel Coating Solution (Solution 1)

90.45 g of glycidoxypropyltrimethoxysilane (Sivento) were weighed in a beaker and stirred. 20.66 g of 0.1N acid were added dropwise to the solution. When all of the acid had been added, the hydrolysate was stirred for a further 15 min. 640 g of a colloid of $TiO_2$ colloid Optolake® 1120Z(11RU-7.A8). (with 20% by weight of dry matter) from CCIC were weighed, 160 g of methanol were added to the colloid solution and stirred at ambient temperature for 15 min.

800 g of the colloid-methanol solution were added to the hydrolysed glycidoxypropyltrimethoxysilane.

The solution was stirred for 24 h at ambient temperature. 9.14 g of 99% aluminium acetylacetonate ([CH3COCH—C(O—)CH3]3Al, Sigma Aldrich) were weighed and added to the solution. 79.75 g of methanol were added to the mixture. Stirring of the solution was continued for a further 1 h at ambient temperature, then the dry extract was measured.

The value was equal to 20%.

The diluent was isopropanol (Carlo-Erba). The quantity of solvent to be weighed and added to the solution must correspond to a dilution of 6% of dry extract. This new 6% solution was stirred for 5 hours, filtered through a cartridge of porosity 3 μm, then stored in the freezer at −18° C.

For deposition, 1 mL of this solution is deposited by spin coating onto the lenses.
2.1.2—Low Refractive Index (LI) sol/gel Solution (Solution 2)

8.1 g of fluorosilane (tridecafluoro-1,1,2,2-tetrahydrooctyl-1-triethoxysilane: C14H19F13O3Si, Roth-Sochiel) were mixed with 65.6 g of tetraethoxysilane (Si(OC2H5)4, Keyser Mackay). The mixture was stirred for 15 min. Then 26.3 g of 0.1N hydrochloric acid (0.1N HCl, Panreac) were added. The hydrolysate was stirred for 24 h at ambient temperature. 737.7 g of 2-methyl-2-butanol (C2H5C(CH3)2OH, Sigma Aldrich), 316.2 g of 2-butanone (C2H5COCH3, Carlo Erba) and 0.28 g of catalyst (Polycat-SA-1/10, Air products) were added. The solution was stirred for 2 h, filtered through a cartridge of porosity 0.1 μm, then stored in the freezer at −18[deg.] C.

For deposition, 1 mL of this solution was deposited by spin coating onto the lenses.
2.2—Deposition Process of the 2 AR Layers:

The lens substrate with the abrasion resistant coating resulting from 1) was fixed to a rotating support of adjustable speed.

A volume ranging from 0.5 to 5 mL of the (HI) solution was deposited in 0.3 s at the centre of the substrate, The speed of rotation of the support was then adjusted to 1750-2300 rev/min, so as to obtain by spin the coating of the substrate with a film of material of high refractive index (spin time: 15 s), The substrate thus coated was then subjected for 16 s to an infrared heat pre-treatment such that the temperature of the coated substrate surface was 80 to 90° C.

The coated substrate was then cooled for 10 to 50 s with a stream of air at a temperature equal to or less than ambient temperature, a volume ranging from 0.5 and 5 mL of the (LI) solution was then deposited in 0.3 s onto the coated substrate, the speed of rotation of the support is then fixed at 1 900-2 000 rev/min, so as to obtain by spin the coating with a film of material of low refractive index (spin time: 15 s).

A substrate coated with an abrasion resistant coating and an anti-reflection stack according to the invention was thus obtained, comprising successively the abrasion resistant coating, a film of material of high refractive index and a film of material of low refractive index, which was then subjected for 8 s to an infrared heat pretreatment. The pre-baking carried out was the same at each step: it consisted of heating the surface of the lens with an infrared (IR) device. An infrared ceramic material with 450 W power was brought near the lens surface. The temperature of the surface of the lens passed from 25° C. to 70-80° C. at the end of the pre-baking step.

Cooling consisted in directing a stream of air at ambient temperature onto the surface of the lens.

Final Heat Treatment:

The optical glass coated with the abrasion resistant coating according to the invention and the anti-reflection stack was then subjected to a final heat treatment at 130° C. for 20 minutes in a DIMA Conveyor oven.

The conditions are summarized in table 3 hereafter.

The test was performed on a device Q PANEL™, model QUV.

The lens was placed for two hours in a chamber at 45° C. and in an atmosphere saturated with water (condensation of water on the surface of the lens). The condensation of water was then stopped and the lens was subjected to UV radiation (0.75 W/m$^2$/mm) for two hours at 45° C. The lens was then left for three hours without irradiation at 45° C. with renewed condensation of water. Then, finally, the lens was subjected to UV irradiation (0.75 W/m$^2$/mm) for three hours at 45° C., without condensation.

The above test was repeated several times.

A mechanical stress was exerted on this lens every 10 hours.

The test was stopped when the mechanical stress induced an appreciable degradation of the anti-reflection stacking.

The mechanical test performed was the following:

A synthetic microfibre cloth, that can be obtained from an optician, was used for cleaning optical lenses. The cloth, constituted of polyamide and Nylon® filaments, must have the following minimal dimensions: 30 mm×30 mm, a thickness of 0.35 mm to 0.45 mm with a minimal fibre density of

TABLE 3

| Ex. | Solution | Deposition speed Rpm | Precuring time (seconds) | Cooling time (s) | Solution 2 | Deposition speed Rpm | Precuring time (seconds) | Cooling time (s) | Final thermal treatment (minutes) |
|---|---|---|---|---|---|---|---|---|---|
| | HI | 1750 | 16" | 50" | LI | 1700 | 8" | 50" | 13 mn-Dima |

3—Tests:

A crosshatch adhesion test was performed on the cured coatings (Dry) and after the coated lenses had been exposed to boiling water for 30 minutes (Wet). Lenses are rated from 0 to 5, with 0 being perfect adhesion.

Dry adhesion of the transferred coatings was measured using the cross-hatch adhesion test according to ASTM D3359-93, by cutting through the coatings a series of 5 lines, spaced 1 mm apart with a razor, followed by a second series of 5 lines, spaced 1 mm apart, at right angles to the first series, forming a crosshatch pattern comprising 25 squares. After blowing off the crosshatch pattern with an air stream to remove any dust formed during scribing, clear cellophane tape (3M SCOTCH® n° 600) was then applied over the crosshatch pattern, pressed down firmly, and then rapidly pulled away from coating in a direction perpendicular to the coating surface. Application and removal of fresh tape was then repeated two additional times. Adhesion is rated as follows (0 is the best adhesion, 1-4 is in the middle, and 5 is the poorest adhesion):

TABLE 4

| Adhesion score | Squares removed | Area % left intact |
|---|---|---|
| 0 | 0 | 100 |
| 1 | <1 | >96 |
| 2 | 1 to 4 | 96-84 |
| 3 | >4 to 9 | 83-64 |
| 4 | >9 to 16 | 63-36 |
| 5 | >16 | <36 |

Durability Test (Scratch and Peel Test).

The lenses of the examples were subjected to a durability test (called QUV S&P(Scratch and Peel test) under the conditions specified hereafter:

10000/cm$^2$. An example of such a cloth is the one manufactured by KANEBO company under the trade name Savina Minimax™.

The cloth was immersed in deionised water for at least two minutes, until it was impregnated with water. The cloth was then recovered, folded in three superimposed layers and placed on the central area of the lens. An eraser 6.5 to 7 mm in diameter was then applied to the centre of the cloth. A force of 5$_+$-1N was applied to this eraser and a forwards-and-backwards movement was made over a distance of 30 mm (the midpoint of the movement being centred on the centre of the lens) by performing one cycle (one to-and-fro movement) per second.

A total of 25 cycles were performed, then the lens was turned through 90° around its axis. A further 25 cycles were performed.

The lens was then examined visually by the naked eye.

Placed against a black background, the lens was examined in reflection.

The source of the reflected beam was a 200 lux source.

The areas where the anti-reflection stack was delaminated appeared luminous.

A lens was considered as having appreciable degradation of the anti-reflection if more than 5% of the surface of the lens in the central area 20 mm in diameter was delaminated by being subjected to the mechanical stress.

Then the lens failed the test. The time to failure is noted and reported in the table of results.

EXAMPLES

Example 1 and Comparative Examples 1-4

4 Commercial UV abrasion resistant coatings, and the abrasion resistant UV curable coating composition n° 3 (Invention) were applied to a polycarbonate lens followed by application of a multi-layered sol-gel anti-reflection coating as described previously in the coating procedure.

| Name | Manufacturer (Coating Type) | |
| --- | --- | --- |
| HT-450 ™ | Gerber Coburn/LTI | (Solvent borne UV curable coating) |
| HT-850 ™ | Gerber Coburn/LTI | Solvent borne UV |
| UV-33 ™ | Ultra Optics/LTI | Solvent borne UV |
| SHC-NT2 ™ | Gerber Coburn/LTI | Solvent borne UV |

Then the adhesion properties of the obtained lenses are evaluated.

TABLE 5

| EXAMPLE | ABRASION RESISTANT COATING | AR COATING ADHESION DRY | AR COATING ADHESION WET | AR WETTING (COSMETICS) | AR ADHESION |
| --- | --- | --- | --- | --- | --- |
| Comparative 1 | HT-450 ™ | FAIL | FAIL | FAIR | 5/5/5/5/5 |
| Comparative 2 | HT-850 ™ | FAIL | FAIL | FAIR | 5/5/5/5/5 |
| Comparative 3 | UV-33 ™ | N/A | N/A | POOR | N/A |
| Comparative 4 | SHC-NT2 ™ | FAIL | FAIL | FAIR | 5/5/5/5/5 |
| Example 1 (invention) | Composition 3 | PASS | PASS | EXCELLENT | 0/0/0/0/0 |

For comparative 3, it was not possible to measure adhesion due to poor wetting.

Examples 2 to 3 and Comparative Examples 5 to 7

TABLE 6

| EXAMPLE | ABRASION RESISTANT COATING | % Glycol Ether | % hydrolyzate of epoxysilane | % Solids | Scratch & Peel Hours to Failure |
| --- | --- | --- | --- | --- | --- |
| Comparative 5 | Composition T | 0% | 0% | 100% | 30 hours |
| Comparative 6 | Composition U | 0% | 4% | 100% | 40 hours |
| Comparative 7 | Composition V | 22% | 0% | 78% | 60 hours |
| Example 2 | Composition 1 | 22% | 4% | 78% | 80 hours |
| Example 3 | Composition 3 | 40% | 4% | 60% | >100 hours |

These examples demonstrate the necessity of the presence of component C (Hydrolyzate of the epoxysilane having hydrolysable groups) and the non polymerizable ether glycol ether (component D) in the claimed proportions to get a significant improvement (80 hours for S&P test).

Example 4 and Comparative Examples 8 to 11

The same abrasion resistant commercial coatings as examples 1 to 4 were compared to the invention (coating composition 3) by first coating polycarbonate lenses with each of these coatings, followed by application of a thermally curable polysiloxane coating composition described in example 3 of EP614957 by dip coating at a thickness of 3.5 to 4.0 μm and cured at 75° C. for 15 min followed by a final cure of 100° C. for 3 hours using a convection oven.

Each group of lenses was then compared for cosmetics and tested for adhesion of the organosilane coating to the UV curable coating both dry and after being exposed to boiling water for thirty (30) minutes.

TABLE 7

| EXAMPLE | ABRASION RESISTANT COATING | COSMETICS (WETTING) | DRY ADHE- SION | WET ADHE- SION |
| --- | --- | --- | --- | --- |
| Comparative 8 | HT-450 ™ | GOOD | FAIL | FAIL |
| Comparative 9 | HT-850 ™ | GOOD | FAIL | FAIL |
| Comparative 10 | UV-33 ™ | POOR | N/A | N/A |
| Comparative 11 | SHC-NT2 ™ | GOOD | FAIL | FAIL |
| Example 4 (Invention) | Composition 3 | GOOD | PASS | PASS |

The invention claimed is:

1. An abrasion resistant photocurable coating composition comprising:
   15 to 30 parts by weight of at least one monomeric compound A having from 5 to 7 acrylate groups;
   7 to 20 parts by weight of at least one monomeric or oligomeric compound A' selected from monomers or oligomers having from 3 to 4 acrylate groups;
   10 to 25 parts by weight of at least one monomeric or oligomeric compound A" having two acrylate groups;
   2 to 10 parts by weight of at least one compound B having at least two epoxy groups and that does not comprise any silicon atom bearing hydrolysable groups or hydroxyl groups;
   1 to 7 parts by weight of a compound C which is a hydrolyzate of an epoxysilane having from 2 to 6 functional groups generating a silanol group under hydrolysis;
   20 to 60 parts by weight of at least one non polymerisable ether compound D;
   an effective amount of a cationic polymerization photo initiator; and
   an effective amount of a radical polymerization initiator.

2. The composition of claim 1, wherein the total weight of compounds A, A' and A" represents at least 80% of the total weight of the polymerizable compounds comprised in said coating composition.

3. The composition of claim 1, wherein compound A has 5 acrylate groups.

4. The composition of claim 1, wherein compound A is dipentaerythritol pentaacrylate.

5. The composition of claim 1, wherein compound A' is a mixture of pentaerythritol triacrylate and pentaerythritol tetra acrylate.

6. The composition of claim 1, wherein compound A" comprises at least one polyoxyalkyleneglycol diacrylate.

7. The composition of claim 1, wherein the non polymerisable ether compound D is an alcohol ether compound.

8. The composition of claim 7, wherein the alcohol ether compound comprises at least one glycol ether.

9. The composition of claim 8, wherein the at least one glycol ether comprises a mixture of 1-methoxy-2-propanol and 2-methoxy-1-propanol.

10. The composition of claim 1, further comprising 35 to 55 parts by weight of non polymerizable ether compound D.

11. The composition of claim 1, wherein said epoxysilane has the following formula:

$$R_n Y_m Si(X)_{4-n-m} \quad (I)$$

wherein:
R groups, independently, are monovalent organic groups linked to the Si atom by a carbon atom and comprising at least one epoxy function;
X groups, independently, are hydrolyzable groups;
Y is a monovalent organic group that does not contain an epoxy group and which is linked to the Si atom by a carbon atom; and
n and m are integers such as n=1 or 2 and n+m=1 or 2.

12. The composition of claim 11, wherein the R group comprises one epoxy function.

13. The composition of claim 11, wherein the R groups have the following formulas V and VI:

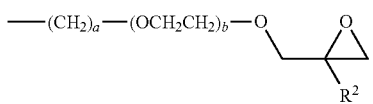

(V)

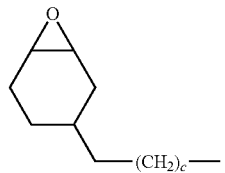

(VI)

wherein:
$R^2$ is an alkyl group or a hydrogen atom;
a and c are integers ranging from 1 to 6; and
b represents 0, 1 or 2.

14. The composition of claim 11, wherein in formula I, n=1, m=0 and X is a C1-C5 alkoxy group.

15. The composition of claim 14, wherein X is —OCH₃.

16. The composition of claim 11, wherein the epoxysilanes comprise γ-glycidoxypropyl triethoxysilane, γ-glycidoxypropyl trimethoxysilane, 2-(3,4-epoxycyclohexyl) ethyltrimethoxysilane and 2-(3,4-epoxycyclohexyl) ethyltriethoxysilane, or a mixture of two or more thereof.

17. An article comprising a transparent substrate and an abrasion resistant coating composition applied thereon, resulting from the curing of an abrasion resistant photocurable coating composition of claim 1.

18. The article of claim 17, having a subsequent coating deposited onto and adhering on the cured abrasion resistant coating composition.

19. The article of claim 18, wherein said subsequent coating is obtained using a sol/gel process and is comprised in an antireflective stack.

20. The article of claim 18, wherein no pretreatment step has been performed on the cured abrasion resistant coating composition before applying said subsequent coating.

21. The article of claim 18, wherein the subsequent coating comprises an epoxysilane hydrolyzate and a colloidal filler.

22. The article of claim 18, wherein said subsequent coating has a thickness ranging from 10 to 200 nm.

23. The article of claim 22, wherein said subsequent coating has a thickness ranging from 80 to 150 nm.

24. The article of claim 17, further defined as an ophthalmic lens.

* * * * *